United States Patent

[11] 3,628,653

| [72] | Inventor | Aaron James Warkentin<br>23561 East Dinuba Ave., Dinuba, Calif. 93618 |
|---|---|---|
| [21] | Appl. No. | 13,707 |
| [22] | Filed | Feb. 24, 1970 |
| [45] | Patented | Dec. 21, 1971 |

[54] AUTOMATIC DISTRIBUTION SYSTEM FOR FRUIT EMPLOYING TILTABLE CONVEYOR BELT
11 Claims, 14 Drawing Figs.

[52] U.S. Cl. .................................................. 198/81,
198/185, 53/390
[51] Int. Cl. .......................................... B41j 19/16
[50] Field of Search .......................................... 198/81,
185, 31, 155, 187; 53/390

[56] References Cited
UNITED STATES PATENTS
3,235,101  2/1966  Milhaupt ...................... 198/31 X 3,400,805  9/1968  Thompson ...................... 198/185 X
3,193,080  7/1965  Speaker ........................ 198/31
2,671,549  3/1954  Lubetkin ....................... 198/31 X

*Primary Examiner*—Richard E. Aegerter
*Assistant Examiner*—H. S. Lane
*Attorney*—Lyon & Lyon ABSTRACT: Apparatus and method of distributing fruit such as citrus fruit or peaches and the like to the tables of a packing house characterized by the use of at least three conveyor belts for the fruit, the outer two of which are mounted to be tilted to dump fruit thereon to the tables as desired at time or space intervals. Deflector means cause fruit to be passed from the inner belt to the outer belts and all drive, support and tensioning means for the outer belts are mounted to be tilted therewith.

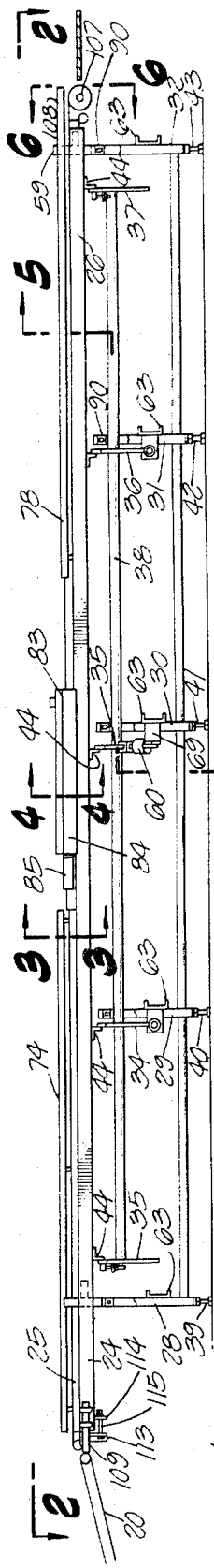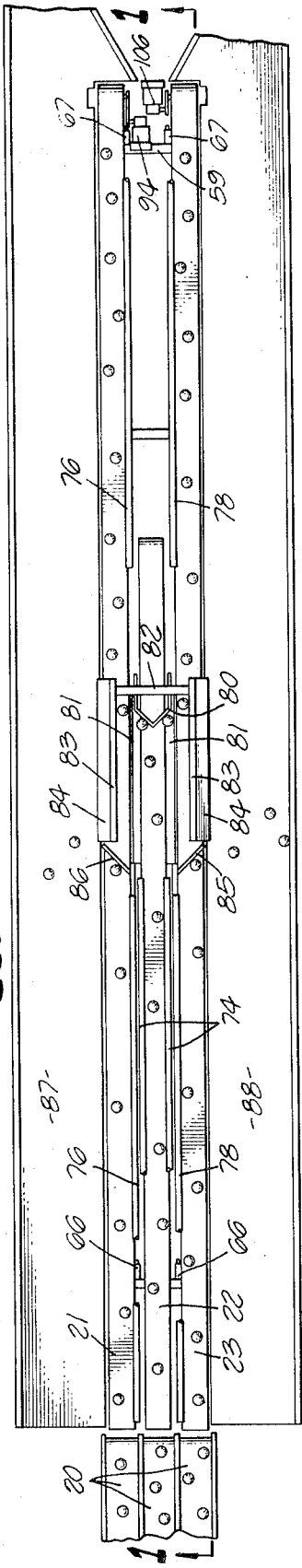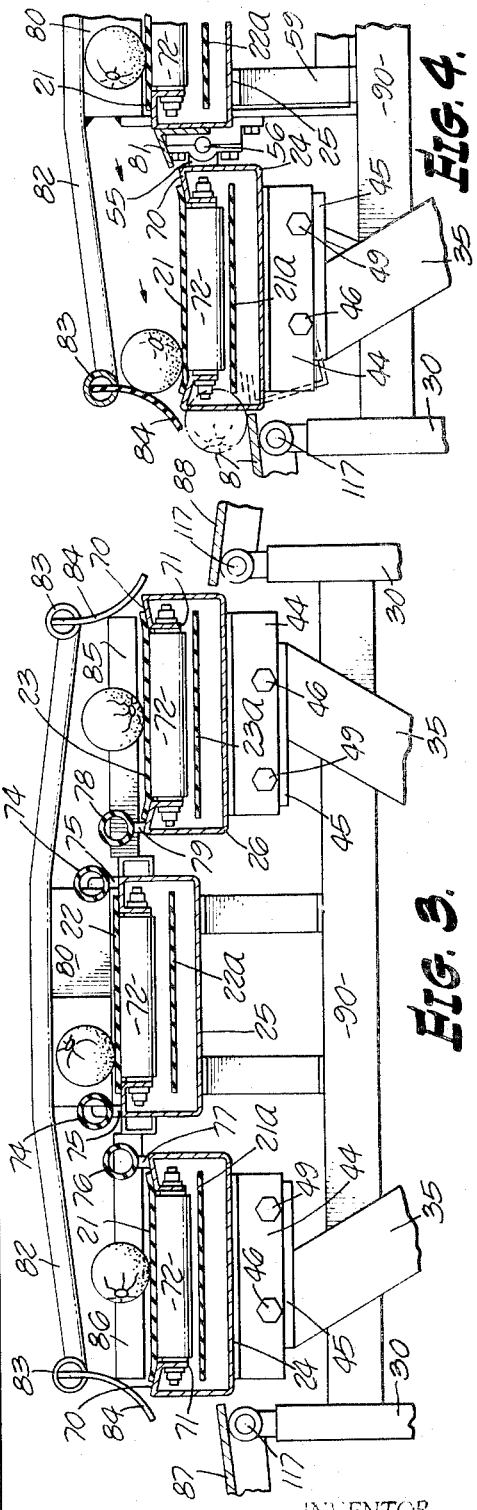

INVENTOR.
AARON JAMES WARKENTIN

Lyon & Lyon
ATTORNEYS

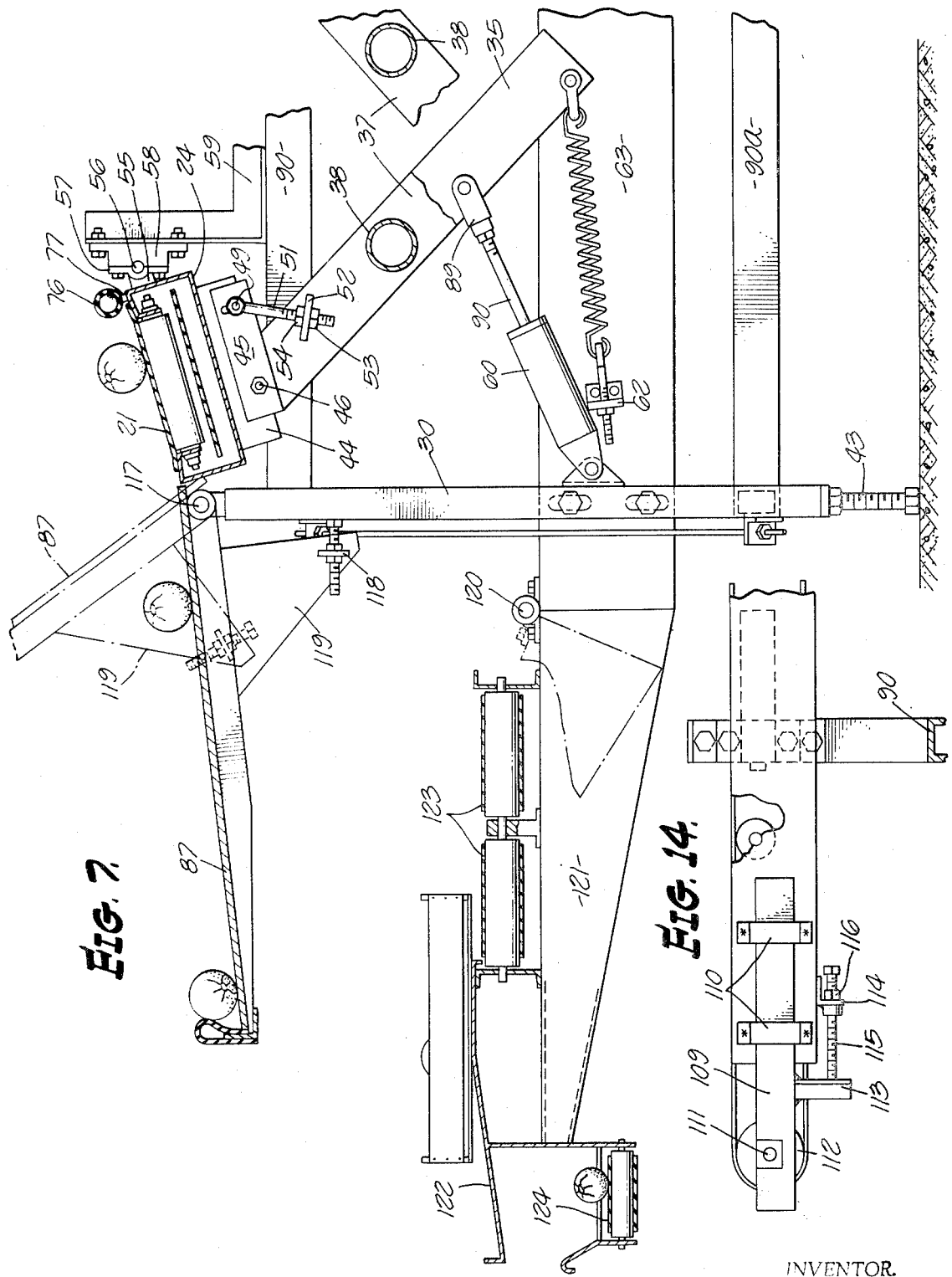

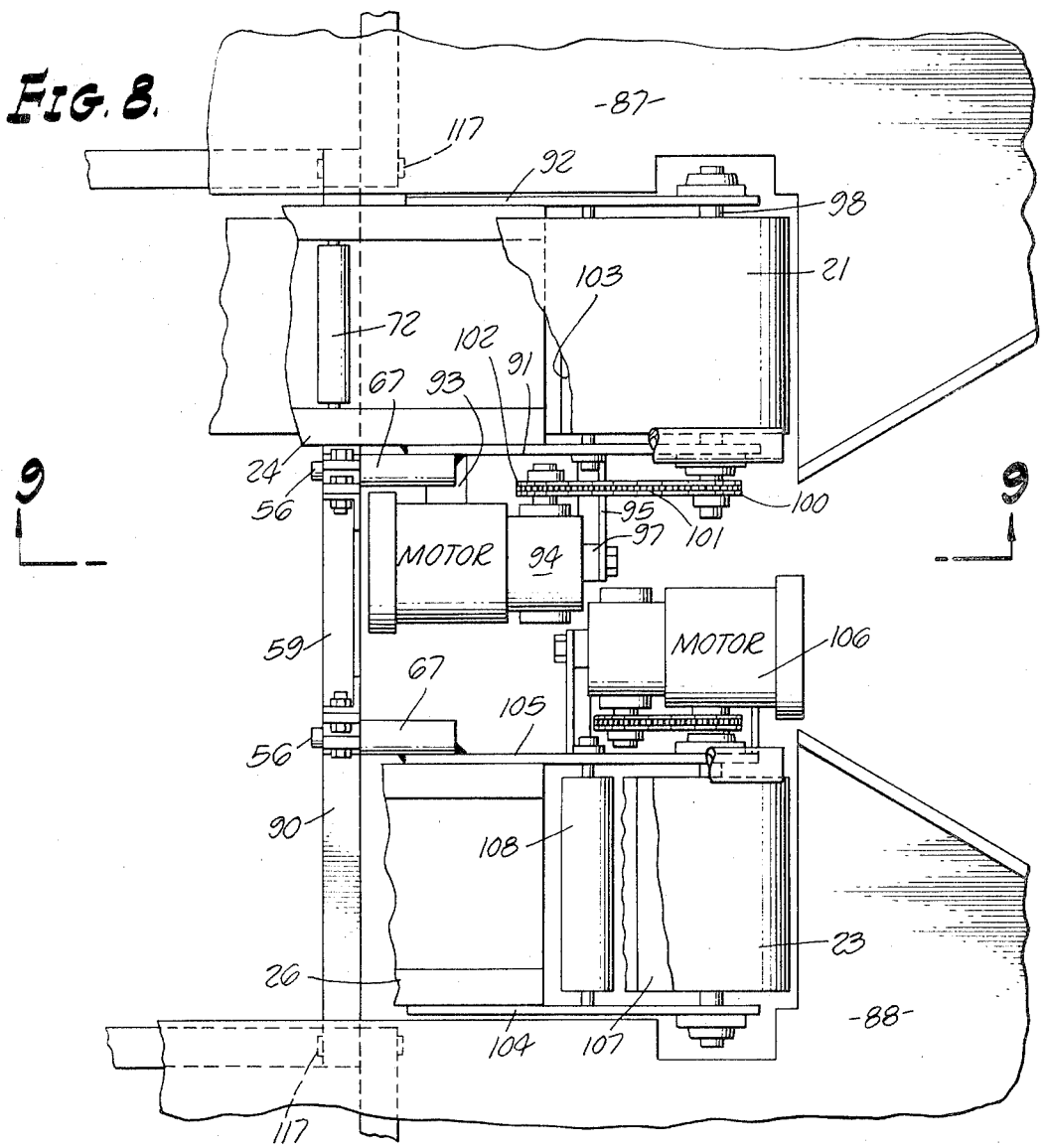

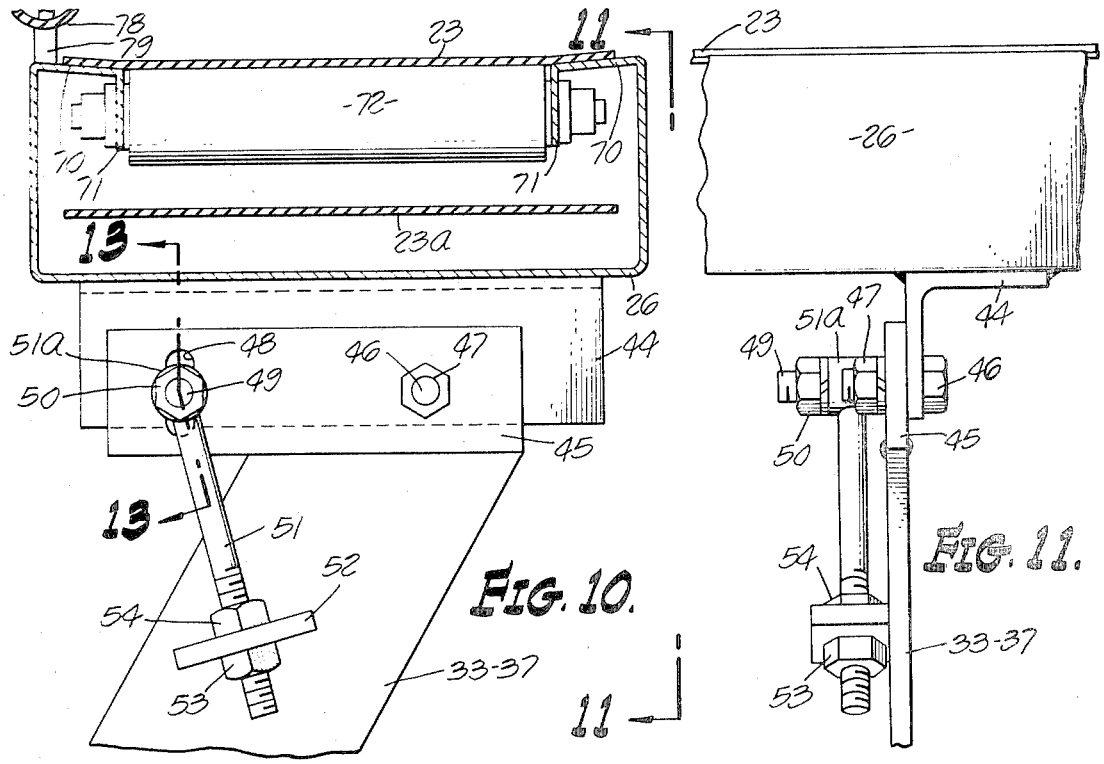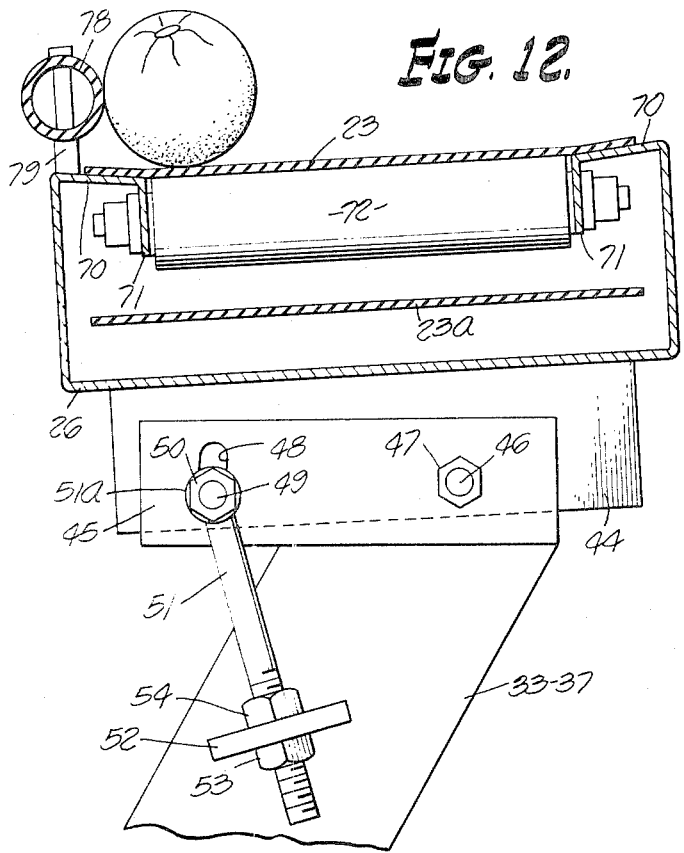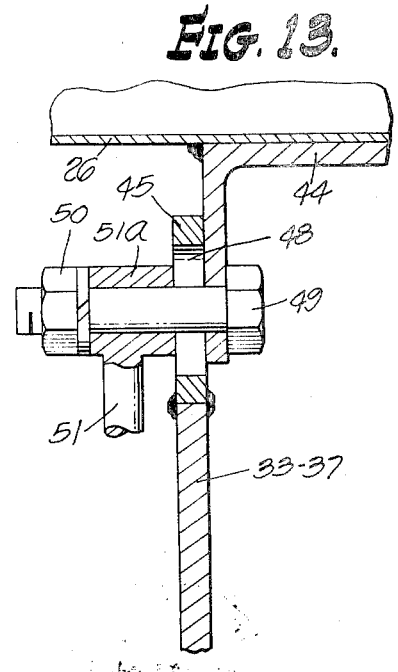

AUTOMATIC DISTRIBUTION SYSTEM FOR FRUIT EMPLOYING TILTABLE CONVEYOR BELT

This invention relates to a process and apparatus for automatic distribution of fruit to stations in a packing house to facilitate and expedite the proper packing of the fruit in the packing boxes, properly sorted as to size.

While applicable to a large variety of different types of fruit, the invention is particularly adapted for use in packing houses for peaches, nectarines, and all kinds of citrus fruits. The ability of the invention to deliver the fruit to the packer's station very gently particularly is useful in the packing of peaches, to prevent bruising the fruit.

It is a basic feature of this invention that a pair of endless conveyor belts are so arranged so as to be tilted sideways periodically and at preset times, so that fruit being conveyed thereby are caused to gently roll off the belts to the packers' stations, thus enabling fruit to be distributed all along the packing table as desired.

It is a further feature of this invention that it can be employed together with existing facilities in conventional packing houses to improve and expedite the packing therein.

It is an object of this invention to provide means for more evenly dividing the supply of fruit to the various persons working at packing stations in a packing house.

These and other objects, features and advantages will be apparent from the annexed specification, in which:

FIG. 1 is a side view of a device embodying the present invention taken along line 1—1 of FIG. 2 with the fruit table omitted;

FIG. 2 is a plan view taken along the line 2—2 of FIG. 1, with the channels which contain the belts omitted;

FIG. 3 is a cross section taken along the line 3—3 of FIG. 1;

FIG. 4 is a cross section taken along the line 4—4 of FIG. 1;

FIG. 7 is a fragmentary view similar to FIG. 6, showing a half only of the mechanism in dumping position FIG. 8 is a top plan view of the drive end of the mechanism taken along the line 8—8 of FIG. 9;

FIG. 9 is a view taken along the line 9—9 of FIG. 8;

FIG. 10 is a section taken through one of the belts and illustrating its angular adjustments;

FIG. 11 is a view taken along the line 11—11 of FIG. 10;

FIG. 12 is a view similar to FIG. 10, showing the belt tilted angularly;

FIG. 13 is a view taken along the line 13—13 of FIG. 10; and

FIG. 14 is a view of the front end of the machine and illustrating the belt tensioning mechanism.

Figure 5:
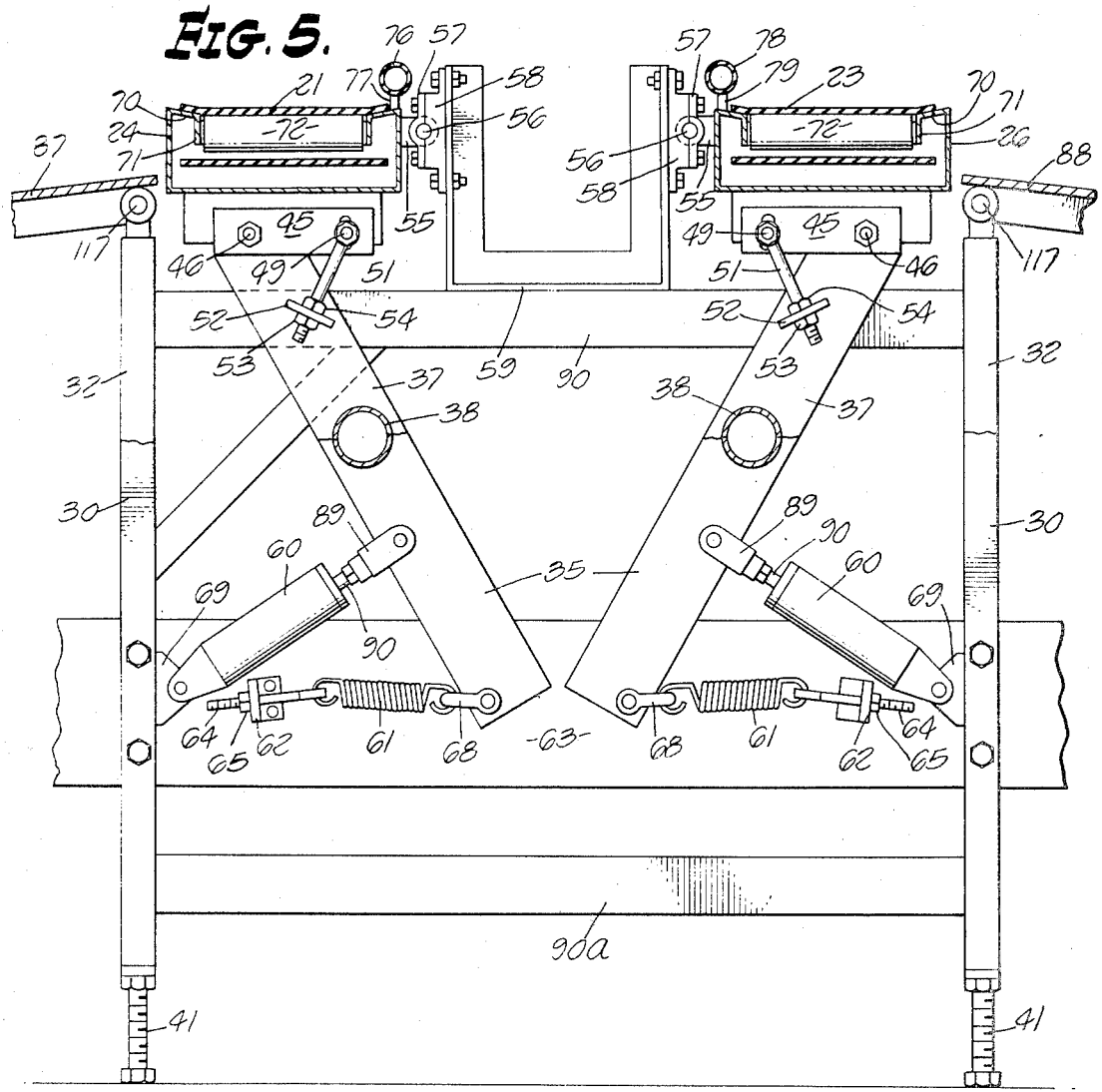
FIG. 5 is a cross section taken along the line 5—5 of FIG. 1.
Figure 6:
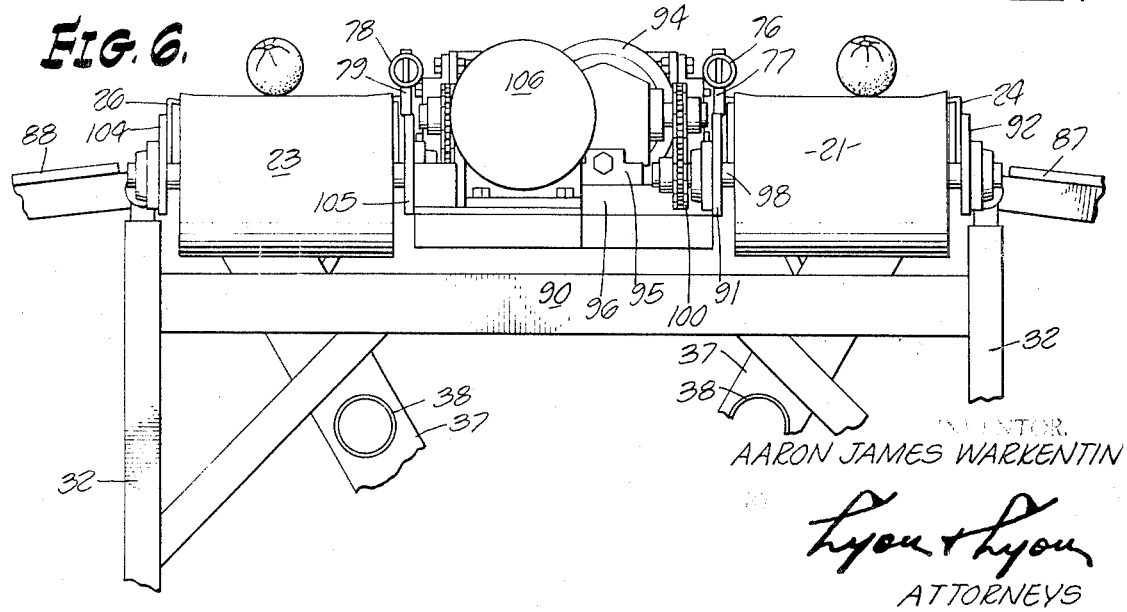
FIG. 6 is a rear view taken along the line 6—6 of FIG. 1.

Referring now more particularly to the drawings, there is illustrated mechanism installed in a packing house wherein fruit to be packed is delivered up inclined carriers 20, which are conventional, to the device of this invention. Fruit from carriers 20 is conveyed to one or the other of endless conveyor belts 21, 22 or 23, which belts are mounted and run in channels 24, 25 and 26.

Channels 24 and 26 have inwardly bent portions 70 which incline downwardly slightly and vertically extending portions 71 between which there is mounted a plurality of belt supporting rollers 72. As the channels 24 and 26 extend the full length of the machine a separate roller 72 may be mounted wherever it is necessary to adequately support the belts. A number of such rollers 72 is shown in the drawings.

As the belts 21–23 are endless each includes a return flight 21a, 22a, and 23a respectively travelling in the channels 24–26 underneath the rollers 72.

Adjacent each side of the belt 22 is a fruit guide 74 supported on legs 75 carried by the channel 25 and the channel 24 carries a fruit guide 76 supported on legs 77, while channel 26 carries a fruit guide 78 supported on legs 79.

About midway of the device there is mounted on the channel 25 a deflector 80 which lies in the path of belt 22 and causes all fruit on belt 22 to be deflected to either belt 21 or belt 23. An angle member 81, the top of which is bent downwardly as shown is attached to each side of channel 25 to form a bridge from belt 22 to belt 21 or 23. Across the top of deflector 80 extends a support arm 82 which supports a pair of longitudinally extending tubular members 83 which mount rubber aprons 84 which prevent fruit deflected by deflector 80 from falling off of belts 21 or 23.

Just in advance of deflector 80 there are deflectors 85 and 86 positioned respectively in paths of belts 21 and 23 and causing all fruit thereon to be deflected to tables 87 and 88, in the event any fruit remains in the belts after they have tilted.

The channels 24 and 26 are supported by a frame including frame members 28, 29, 30, 31 and 32 which each are supported on adjustable leveling legs 39, 40, 41, 42 and 43 by means of which the whole mechanism can be properly leveled.

A pair of tubes 38 are provided, one associated with the channel 24 and the other with the channel 26. Arms 33, 34, 35, 36 and 37 are welded to tube 38 and each such arm is welded to a plate 45. An L-shaped angle 44 is welded to the bottom of each channel 24 or 26, and is provided with an elongated slot 48, a bolt 46 and nut 47 bolt plate 45 and angle 44 together with pivotal connection. Another bolt 49 and nut 50 secure the cylindrical head 51a of a rod 51 to angle 44 and plate 45 with bolt 49 extending through slot 48. A bracket 52 is welded to arm 33–37 and rod 51 extends through an aperture (not shown) therein and is held in place by a nut 53 and lock nut 54.

By reference to FIGS. 10–13 it will be apparent that each channel 24 or 26 and hence its associated belt 23 or 21 can be oriented from a level attitude as shown in FIG. 10 to a tilted one as shown in FIG. 12 by an adjustment of rod 51 by means of nuts 53 and 54. It is usually desired to tilt the channels slightly as shown in FIG. 12 so as to cause the fruit to ride against guides 76 or 78.

The frame is bolstered by attaching to each frame member 28–32 a channel 63, an upper frame member 90 and a lower frame member 90a. Upper frame member 90 associated with member 32 carries a "U"-shaped frame 59 formed of angle irons.

A boss 55 is welded to each channel 24 and 26 and carries a hinge pin 56 which pin is pivotally mounted in a hinge bearing 58 by a hinge bearing cap 57, the cap and hinge bearing being secured together by suitable bolts or cap screws and bolted to an upright leg of the "U"-shaped frame 59, as shown. Such a hinge construction for pivotally supporting the channels 24 and 26 is repeated for each channel near the start and finish of the mechanism, as shown at 66 and 67.

A bracket 62 is welded to channel 63 and a threaded rod 64 extends through a hole therein and is secured by a nut 65. The end of rod 64 is in the form of an eye into which is hooked one end of a tension spring 61 the other end of which is hooked into a member 68 pivotally attached near the end of arm 35. It will be appreciated that the just described mechanism is repeated for the other side of the mechanism associated with channel 26.

An air cylinder 60 is pivotally attached to a bracket 69 carried by frame member 32 and the other end of the air cylinder is pivotally attached by means of a member 89 to an intermediate position on arm 35, as indicated. It will be appreciated that by energizing the air cylinder to cause its rod 90 to be extended the channel 24 (for example) will be pivoted about the hinges 66 and 67 to tilt from the position shown in FIG. 5 to that shown in FIG. 7 (the dumping position).

Referring now more particularly to FIGS. 8 and 9 there is illustrated therein the end of the mechanism containing the belt drives for belts 21 and 23. Belt 22 is driven from the other end of the machine by conventional drive means not shown. Welded to channel 24 along the sides thereof are a pair of plates 91 and 92 and an angle 93 extends laterally from plate 91 and a motor 94 is supported thereon. A second angle 95 also extends laterally from the plate 91, as does a companion angle 96. Angles 95 and 96 are joined together and serve to support a boss 97 on motor 94. A shaft 98 extends between plates 91 and 92 and a pulley 99 driven by a sprocket 100 is in turn driven by a chain 101, which engages a drive sprocket 102 on the output shaft of motor 94. A takeup roller 103 is provided. It will be understood that belt 21 passes over pulley 99 and then up and over roller 103. Similarly channel 26 carries a pair of plates 104 and 105 which similarly mount a motor 106, which drives a pulley 107 which in turn drives belt 23 which passes from pulley 107 to roller 108. It will be noted that all of the assemblies just described, i.e., motor, pulley, roller and associated mechanism are ultimately supported on the channels 24 and 26, and hence tilt with the channels when they turn about the hinges 67.

At the front of the machine there is provided a belt tensioning mechanism (see FIG. 14). To accomplish this each channel 24-26 carries a pair of plates 109 slidable mounted by members 110 against the sides of the respective channels. The plates 109 carry between them shaft 111 on which is mounted pulley 112 which carries a respective belt 21-23. An angle 113 is welded to one of the plates 109 and an angle 114 is welded to the bottom plate of a channel, and an adjusting screw 115 passes through an opening in angle 114 and bears against angle 113 to apply tension to the belts. Screw 115 is locked in place by a nut 116.

As illustrated, the tables 87 and 88 which ultimately receive the fruit to be packed are pivoted, as at 117 adjacent the tops of frame numbers 28-32 and have adjustable stops 118 carried by gussets 119 depending from the tables for adjustably positioning the tables for convenient heights for the packers to work. This is however conventional and no part of the present invention.

Underneath the tables 87 and 88 there is attached to the channel 63 as by pivot 120 a table 121 upon which is mounted a box support 122, a conveyor 123 for filled boxes, and a conveyor 124 for rejected fruit. These, too, form no part of the present invention.

The operation of the above described device is as follows: Fruit on the carriers 20 has already been sorted as to size and culls rejected, so that prime fruit is passed to belt 22 and usable, but different sized fruit to belts 21 and 23. There will be packing house workers stationed all along tables 87 and 88 hand selecting fruit as its rolls down the tables and placing the fruit in packing boxes. Any fruit remaining on belts 21 and 23 despite their tilting is deflected off to tables 87 and 88 by deflectors 85 and 86, so that the belts passing under these deflectors are empty. However, fruit on belt 22 is deflected by deflector 80 to either belt 21 or 23, so that these belts now have a new supply of prime fruit.

The problem is to so distribute the fruit so that each of the packers has an adequate but not excessive supply of fruit readily at hand. This will vary according to the amount of fruit being sent through, but the distribution of the fruit along the tables 87 and 88 is controlled by periodically tilting the belts 21 and 23 so as to dump the fruit from these belts to the tables (see FIG. 7). This is accomplished by energizing the air cylinders 60. By means of suitable timing mechanism associated with the air supply (not shown) cylinders 60 may be caused to act at any given time interval and thus dump the fruit from the belts according to the amount passing through. It will be appreciated that by reason of the fact that channels 24 and 20 are themselves tilted and that they support all of the drive and tensioning mechanism, the tilting operation does not interrupt the driving of belts 21 and 23.

While there has been described what at present is considered a preferred embodiment of the present invention, it will be appreciated by those skilled in the art that various modifications and changes can be made therein without departing from the essence of the invention.

I claim:

1. Apparatus for distributing fruit to be packed to tables in a packing house comprising:
    a carrier for fruit;
    at least three adjacent parallel conveyor belts arranged to receive fruit from said carrier;
    a deflector arranged in the path of the inner belt or belts and adapted to deflect fruit on said inner belt or belts to said other belts; and
    means for tilting said outer belts about an axis parallel to the direction of said outer belts to dump all fruit from said outer belts to said tables at predetermined intervals.

2. Apparatus as set forth in claim 1 in which said means for tilting said outer belt comprises: Channels housing said belts and belt supporting rollers, hinges pivotally mounting said channels to a frame; and actuating means for tilting said channels about the axis of said hinges.

3. Apparatus as set forth in claim 1 in which said means for tilting said outer belts comprises: Channels housing said belts and belt supporting rollers, hinges pivotally mounting said channels to a frame; actuating means for tilting said channels about the axis of said hinges; and drive motors mounted on said channels for driving said outer belts.

4. Apparatus as set forth in claim 1 in which said means for tilting said outer belts comprises: Channels housing said belts and belt supporting rollers, hinges pivotally mounting said channels to a frame; and air driven actuating means for tilting said channels about the axes of said hinges.

5. Apparatus as set forth in claim 1 in which said means for tilting said outer belts comprises: Channels housing said belts and belt supporting rollers, hinges pivotally mounting said channels to a frame; actuating means for tilting said channels about the axis of said hinges; drive motors mounted on said channels for driving said outer belts; and belt tensioning means carried by each of said channels for tensioning the associated outer belt.

6. Apparatus as set forth in claim 1 in which said means for tilting said outer belts comprises: Channels housing said belts and belt supporting rollers, hinges pivotally mounting said channels to a frame; actuating means for tilting said channels about the axis of said hinges; and a means for tilting said channels independently of said first-mentioned means to dispose fruit in the associated belts to one side of said belts.

7. Apparatus as set forth in claim 1 including fruit guide means adjacent each side of said inner belt to prevent fruit from leaving said inner belt until deflected therefrom.

8. Apparatus as set forth in claim 2 in which said actuating means comprises a plurality of support arms for each of said channels, a tube extending longitudinally of said apparatus and welded to each of said support arms, a hydraulic piston operably attached to one of said support arms and adapted to tilt said arm, said tube and its associated channel about the axis of the associated hinge.

9. Apparatus as set forth in claim 2 in which said actuating means comprises a plurality of support arms for each of said channels, a tube extending longitudinally of said apparatus and welded to each of said support arms, a hydraulic piston operably attached to one of said support arms and adapted to tilt said arm, said tube and its associated channel about the axis of the associated hinge, and spring means constantly biasing said support arms towards level position.

10. Apparatus according to claim 2 in which said actuating means comprises a plurality of support arms for each of said channels, a tube extending longitudinally of said apparatus and welded to each of said support arms, a hydraulic piston operably attached to one of said support arms and adapted to tilt said arm, said tube and its associated channel about the axis of the associated hinge, spring means constantly biasing said support arms towards level position, and said spring means and said hydraulic piston each having one end thereof attached to said frame.

11. A process of distributing fruit to a packing table comprising the steps of: conveying fruit to be packed to a plurality of at least three adjacent parallel conveyor belts; conveying fruit on said belts to an intermediate stage; thereafter deflecting fruit from the inner belt to the outer belt and periodically tilting said outer belts about an axis parallel to said belts to dump all fruit from the outer belts to the table.

* * * * *